United States Patent [19]

Ernst

[11] Patent Number: 4,458,481
[45] Date of Patent: Jul. 10, 1984

[54] COMBUSTOR FOR REGENERATIVE OPEN CYCLE GAS TURBINE SYSTEM

[75] Inventor: Hermann Ernst, Saint Cloud, Minn.

[73] Assignee: Brown Boveri Turbomachinery, Inc., Saint Cloud, Minn.

[21] Appl. No.: 357,836

[22] Filed: Mar. 15, 1982

[51] Int. Cl.³ .............................................. F02C 7/10
[52] U.S. Cl. .................................. 60/39.511; 60/754; 60/757; 60/759; 60/760
[58] Field of Search ...................... 60/39.511, 760, 752, 60/753, 754, 755, 756, 757, 758, 759; 122/164; 126/375

[56] References Cited

U.S. PATENT DOCUMENTS

| | | | |
|---|---|---|---|
| 2,446,059 | 7/1948 | Peterson et al. | 60/760 X |
| 2,684,572 | 7/1954 | Marskell et al. | 60/758 X |
| 3,122,886 | 3/1964 | Davidovic | 60/39.511 X |
| 4,050,241 | 9/1977 | Dubell | 60/757 |
| 4,090,360 | 5/1978 | Erismann | 60/758 X |
| 4,207,842 | 6/1980 | Kehlhofer | 60/39.182 X |
| 4,300,349 | 11/1981 | Heckel | 60/39.511 |
| 4,380,906 | 4/1983 | Dierberger | 60/757 |

OTHER PUBLICATIONS

Okuhara, et al., "Large-Capacity Gas Turbine", Toshiba Review, Sep.-Oct. 1978, pp. 33-37.

Primary Examiner—Louis J. Casaregola
Assistant Examiner—Donald E. Stout
Attorney, Agent, or Firm—Daniel H. Bobis

[57] ABSTRACT

A counter flow combustor for regenerative open cycle turbine systems has an outer casing defining a head cavity at one end, an inner casing mounting in said outer casing, said inner casing defining a combustion chamber. An annular insulated partition and support means is connected at its upper end to the inner wall of the outer casing and at its lower end to the discharge outlet end of the inner casing, said inner casing including a cooling and metering wall assembly about the secondary combustion zone having cooling means communicating at one end with a head cavity extension space and at the other end with the secondary combustion zone for delivering heated combustion air thereto and support means on the insulated partition and support means operatively connected to the cooling and metering wall assembly to hold the same in assembled position in the combustor. The cooling and metering wall assembly is formed from a plurality of circumferentially disposed shaped and formed sections serially connected to each other, each respectively having a cooling means therein, said cooling means having a plurality of inlets in communication with the head cavity extension space, and in communication with a slotted exit means formed by an inner wall shaped skirt on the cylindrical formed section. Said assembly also has a plurality of circumferentially disposed supporting struts to prevent the circumferentially shaped and formed sections from collapsing due to thermal stresses arising from pressure and temperature differential in the secondary combustion zone of the combustor.

30 Claims, 9 Drawing Figures

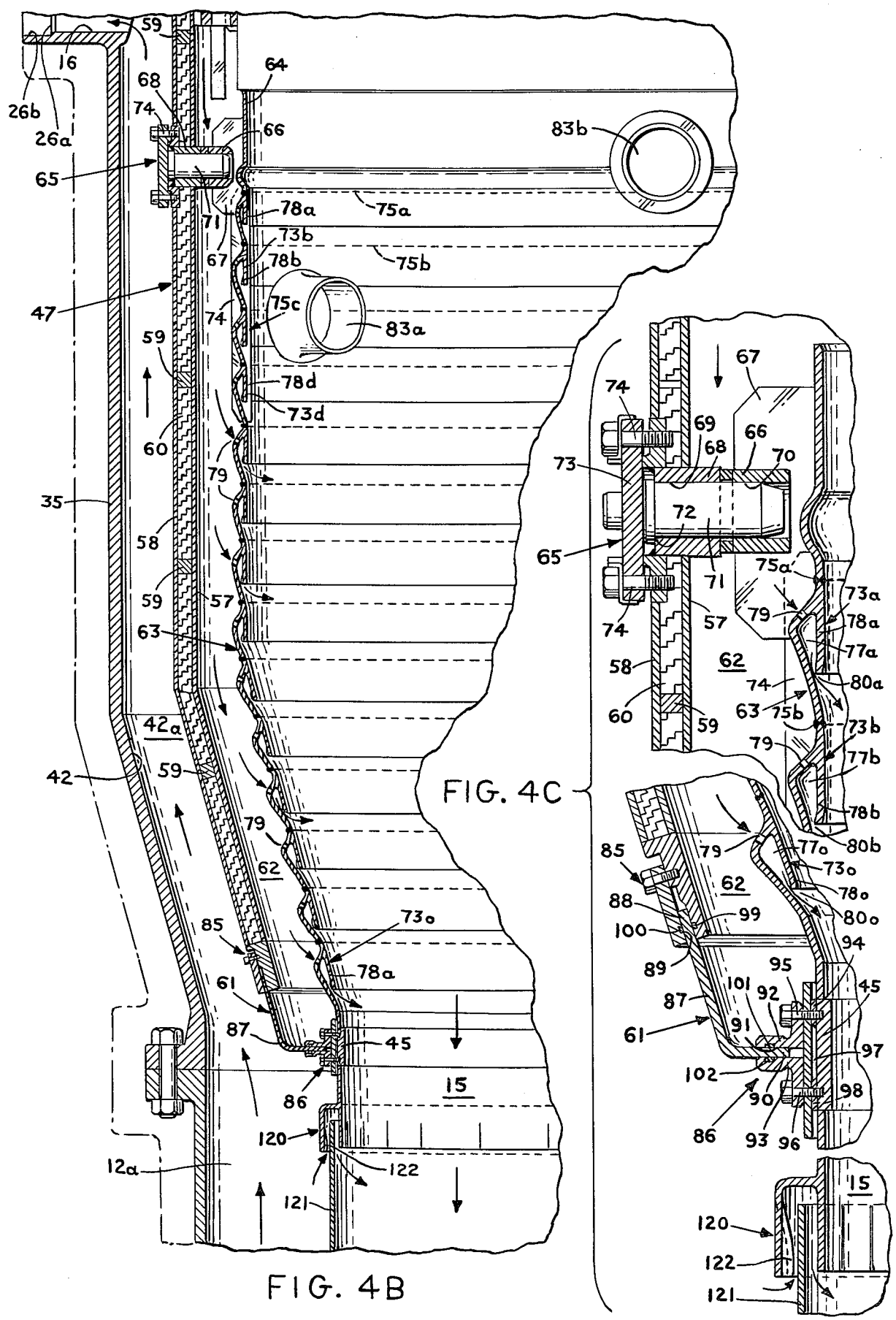

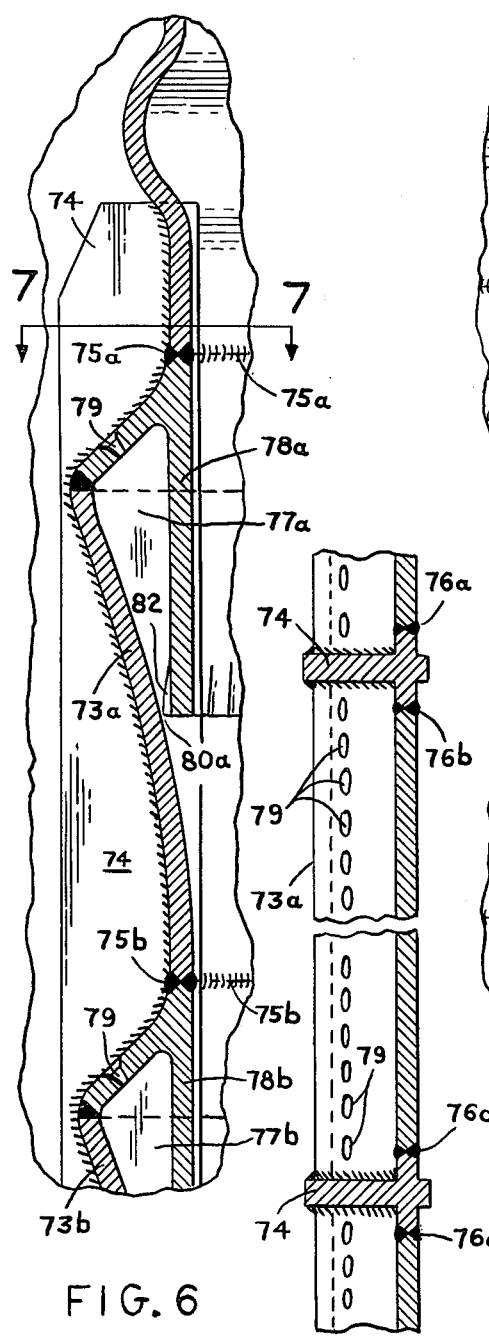
FIG. 6
FIG. 7
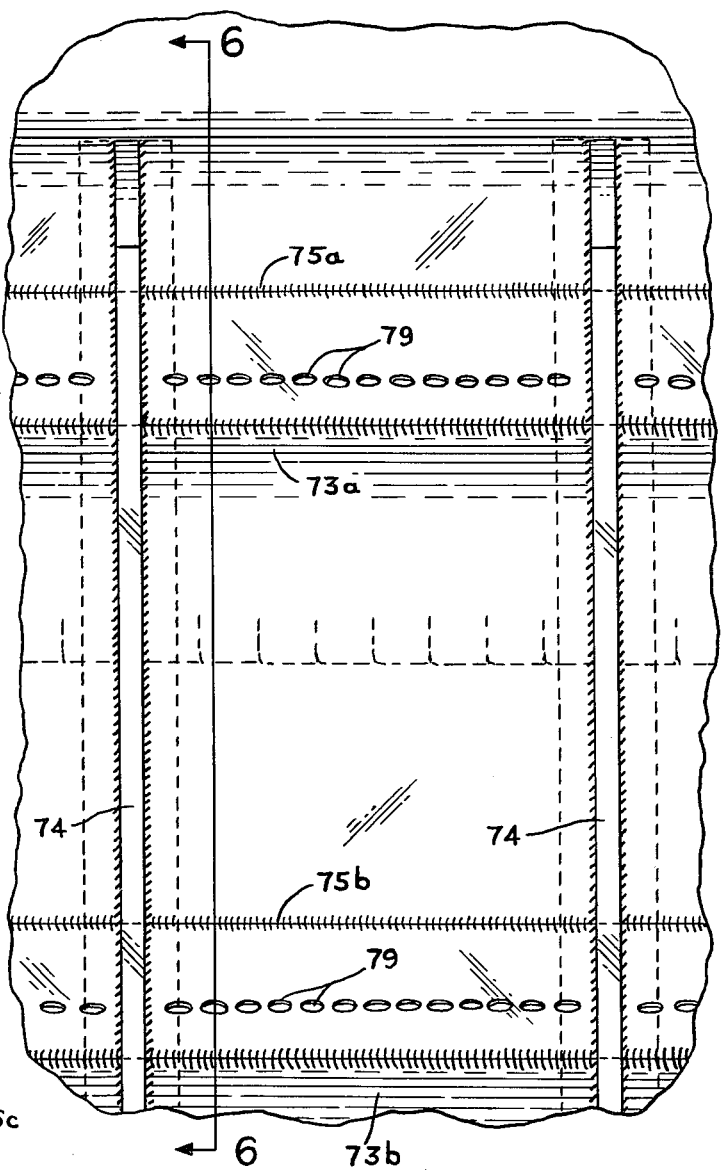
FIG. 5

COMBUSTOR FOR REGENERATIVE OPEN CYCLE GAS TURBINE SYSTEM

BACKGROUND OF THE INVENTION

The present invention is concerned generally with combustors and their use in regenerative open cycle gas turbine systems and more particularly with a diverter and parallel flow combustor capable of diverting compressed combustion air by counterflow to a regenerator for heating the compressed combustor air and of using said regenerator heated compressed combustion air at temperatures of 1000° F. or higher for both mixing and burning with gaseous or liquid fuels in the primary and secondary combustion chambers therein and to provide by parallel flow cooling of the improved combustion chamber elements in the combustor.

With rising fossil fuel prices, the production cost of thermal and electrical energy has risen dramatically. Therefore, the conversion efficiencies of modern fossil fuel plant installations have become more important. The economics of power generation are beginning to favor power plant installations with thermal cycles having high turbine inlet temperatures in order to attain low energy production costs through improved overall thermal efficiencies. Modern fossil fuel installations now include combined gas turbine and steam turbine systems or open cycle elevated temperature gas turbine systems with regenerators.

Prior art combustors have been designed generally to operate with a regenerator to deliver heated combustion air to the combustor at temperatures as high as 1000° F. or higher. This is about 350° F. higher than the combustion air inlet temperature used in known prior art combustors used in a simple open cycle gas turbine system.

Various combustors for use with gas turbine systems are disclosed in U.S. Pat. Nos. 4,288,980; 3,738,106; 3,720,497; 3,608,309; 3,589,509; and 2,648,950. In the combustors disclosed in these patents, compressed combustion air is passed about the combustion chamber in a direction counter to the direction of flow of the combustion gases therein, primarily for the purpose of cooling the inner liner or wall about the combustion chamber before the air is delivered and burned in the combustion chamber. This type of counter flow operation, provides film cooling of the combustion chamber wall, but cannot meet the cooling requirements necessary to safely operate with regeneration pre-heated combustion air temperatures of about 1000° F. and higher used for mixing and burning with liquid and gaseous fuel as is accomplished in accordance with the present invention.

The present invention provides an improved combustor which can satisfy those requirements. Additionally, the diverter and parallel flow combustor in accordance with the present invention permits use of a support casing for the combustor between the turbine-compressor of a regenerative open cycle gas turbine system thus eliminating connecting piping and the conventional spool piece support heretofore used with the prior art counter flow combustors.

SUMMARY OF THE INVENTION

Thus the present invention covers an improved diverter and parallel flow combustor which includes, a hollow outer casing closed at one end to form a head cavity, and a hollow inner casing mounted in the outer casing to define therein a combustion chamber having, a primary combustion zone, a secondary combustion zone communicating with the primary combustion section, and a discharge outlet for combustion gases communicating with the secondary combustion zone to pass combustion gases from the combustion chamber, an annular insulated partition mounted between the outer casing and the inner casing to form with the wall of the outer casing, an annular transfer flow passage for relatively cool combustion air and to form with the wall of the inner casing a head extension passage and space for combustion air in communication with the head cavity for cooling the outer surface of the inner casing, an inlet port for relatively cool combustion air formed between the discharge outlet for the combustion chamber and the outer casing is disposed in communication with one end of the annular inlet flow passage, an oulet port in the outer casing is disposed in communication with the annular transfer flow passage a spaced distance from the inlet port, said outlet port is connectable to a suitable source for heating the combustion air to the desired elevated operating temperature, a plurality of inlet nozzles on the outer casing in communication with the head cavity return the heated combustion air to the combustor, and means formed on and operatively associated with the inner casing delivers the combustion air at the elevated operating temperatures to the combustion chamber formed by the inner casing along with the proper ratio of fuel for combustion therein.

The combustor as above described wherein the inner casing defining the combustion chamber has a plurality of spaced interrelated metallic plates lining the inner casing about the primary combustion zone, an annular cooling and metering wall assembly defining the secondary combustion zone communicating at one end with the primary combustion zone and at the opposite end with the discharge outlet for combustion gases, and said annular cooling and metering wall assembly including, a plurality of circumferentially disposed cooling chambers, and a metering passage means communicating at one end with the head extension passage and space and at the opposite end with the secondary combustion zone to pass heated combustion air into the secondary combustion zone.

The combustor as above described including, a plurality of circumferentially spaced support brackets on the annular insulated partition for mounting the annular cooling and metering wall assembly in assembled position in the combustor, and a plurality of circumferentially spaced vertical reinforcing struts on the annular cooling and metering wall assembly.

Additionally, the combination of the improved diverter and parallel flow combustor as described above with a gas turbine compressor system wherein, the compressor provides combustion air for the combustor and the turbine receives combustion gas from the discharge outlet of the combustor for driving the turbine.

Accordingly, it is an object of the present invention to provide a diverter and parallel flow combustor for providing combustion gas which includes means for cooling the inner casing defining the combustion chamber which is operatively associated with heated compressed combustion air to assure safe wall temperatures for the walls thereof forming the respective primary and secondary combustion zones of the combustion chamber.

It is another object of the present invention to provide an outer casing for a combustor which can utilize conventional materials and safely withstand elevated combustion air inlet temperatures of about 1000° F. and higher.

It is another object of the present invention to provide an inner casing wall forming the primary and secondary combustion zones of materials and structure to safely withstand elevated combustion gas temperature therein.

It is another object of the present invention to provide an annular cooling and metering wall assembly having, spaced cooling means, and metering units for passing heated combustion air through said spaced cooling means into the secondary combustion zone of the secondary combustion chamber.

It is still another object of the present invention to provide a plurality of circumferentially spaced supporting units for mounting the annular cooling and metering wall assembly to define the secondary combustion zone of the combustion chamber, and circumferentially spaced vertical supporting struts to reinforce the said annual cooling and metering wall assembly in assembled position.

Other objects and advantages of the combustors in accordance with the present invention and in their combination with a gas turbine compressor system will become apparent from the following description of the present invention taken with the drawings in which:

FIG. 4B is an enlarged fragmentary side view partly in vertical section of the lower end of the outer casing, the lower end of the insulated partition, and the portion of the inner casing defining the secondary combustion zone in the combustor shown in FIG. 1.

Figure 1:
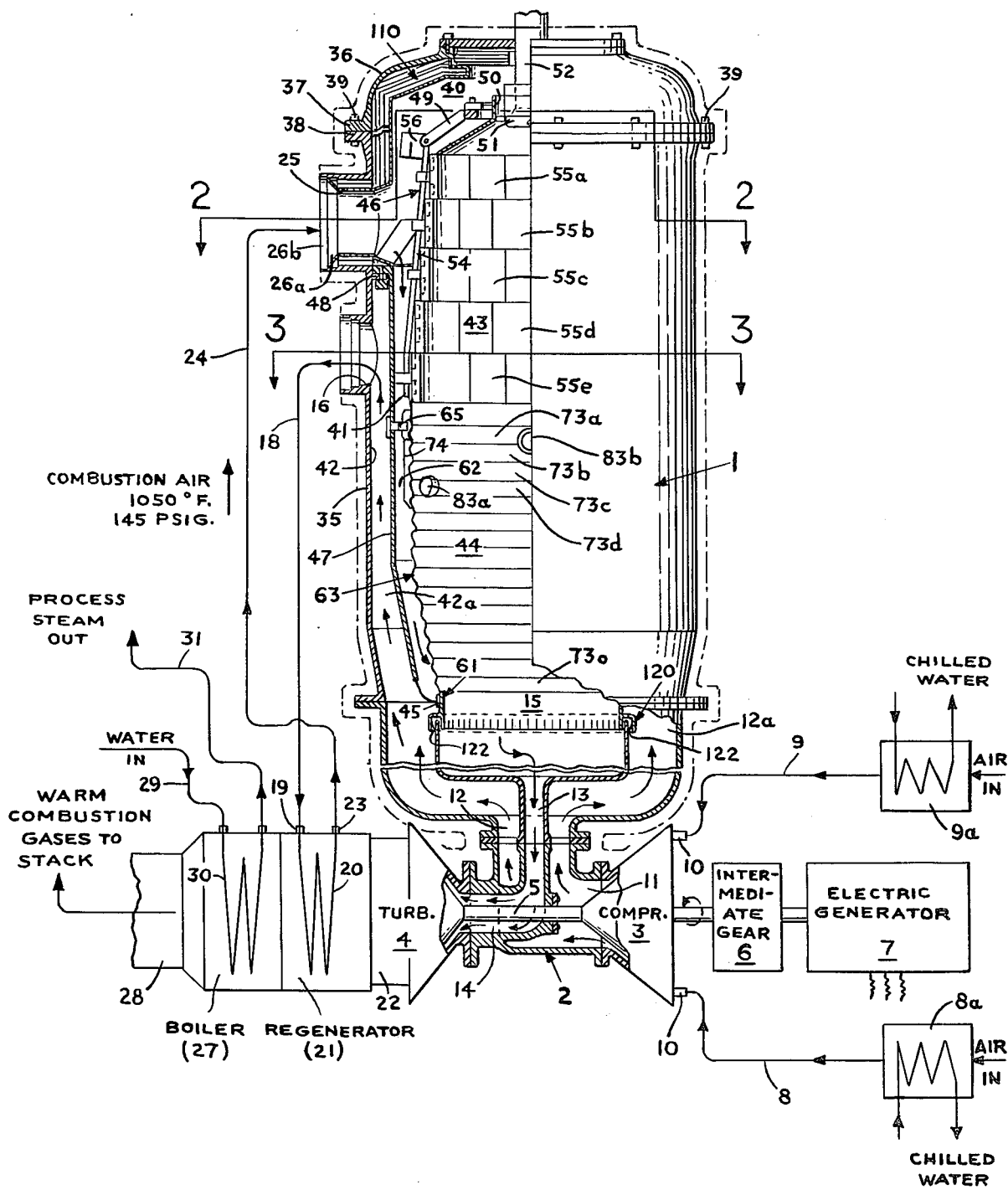
FIG. 1 is a schematic illustration of a regenerative open cycle gas turbine system for driving a generator having an improved combustor in accordance with the present invention shown partly in vertical section.

FIG. 4C is an enlarged fragmentary side view partly in vertical section of the pin support, between the annular insulated partition and the upper end of the annular cooling and metering assembly of the inner casing defining the secondary combustion zone in the combustor shown in FIG. 1 and the end joint or seal assembly at the lower end of the annular cooling and metering assembly of the inner casing.

FIG. 5 is an enlarged side view of the fragment of the outer wall of the annular cooling and metering wall assembly of the inner casing defining the secondary combustion zone in the combustor shown in FIG. 1.

FIG. 6 is a cross-section taken on line 6—6 of FIG. 5.

FIG. 7 is a cross-section taken on line 7—7 of FIG. 6.

Referring to the drawings, FIG. 1 illustrates schematically and diagrammatically a regenerative open cycle gas turbine compressor system which includes a combustor 1 in accordance with the present invention more fully described hereinafter.

Combustor 1 is mounted on a support housing 2 disposed between a compressor 3 and a turbine 4. The support housing 2 serves to support the combustor 1 closely adjacent to the compressor 3 which delivers combustion air to the combustor and the turbine 4 which receives hot combustion gases from the combustor 1 for driving the turbine 4 as is shown in FIG. 1 of the drawing.

A common drive shaft 5 extending from the turbine 4 through the support housing 2 to the compressor 3 provides means for driving the compressor 3. On one end of the shaft 5, opposite from the support housing 2 and on the remote side of the compressor 3, shaft 5 is also connected for driving engagement either direct or through reduction gearing 6 to an electric generator 7 or other rotary device to be operated by this turbine compressor drive system.

Those skilled in the art will recognize that the support housing 2 is a departure from the conventional U-duct means for passing combustion gases from the combustor to the turbine-compressor driving system. Use of the support housing 2 will permit the combustor 1 to be top mounted relative the compressor 3 and turbine 4 so as to materially reduce the distance of the flow path of the compressed combustion air from the compressor 3 to the combustor 1 and of the hot combustion gases from the combustor 1 to the turbine 4 the effect of which is to decrease thermal losses and therefore increase thermal efficiency for the regenerative open cycle compressor system illustrated herein.

Combustion air for the combustor 1 enters the system through inlet lines 8 and 9 preferably at a temperature of about 60° F. or lower because compression is more efficient at this lower temperature. If necessary chillers as at 8a and 9a can be provided to aid in preconditioning the combustion air. The inlet lines 8 and 9 are connected to deliver the combustion air to the suction inlet 10 of the compressor 3. In the compressor 3 the combustion air is compressed and discharged from the discharge outlet 11 of the compressor at about 650° F. and 150 P.S.I.G. to a generally annular outer or first flow passage 12 in the support housing 2.

Support housing 2 is also provided with a second flow passage 13 spaced centrally with respect to the annular first passage 12 which coacts with the combustor 1 as is hereinafter described for delivering hot combustion gases from the combustor 1 to the inlet 14 for the turbine 4, all of which is shown in FIG. 1 of the drawings.

The compressed combustion air passes through the first fluid flow passage 12 to annular combustion air inlet port 12a which surrounds the discharge outlet 15 for the combustor 1. This relatively cool combustion air passes through the combustor in a direction counter to the direction flow of the high temperature combustion gases discharging from the discharge outlet 15 of the combustor 1 and exits through combustion air exit ports 16 as is more fully described hereinafter.

Figure 3:
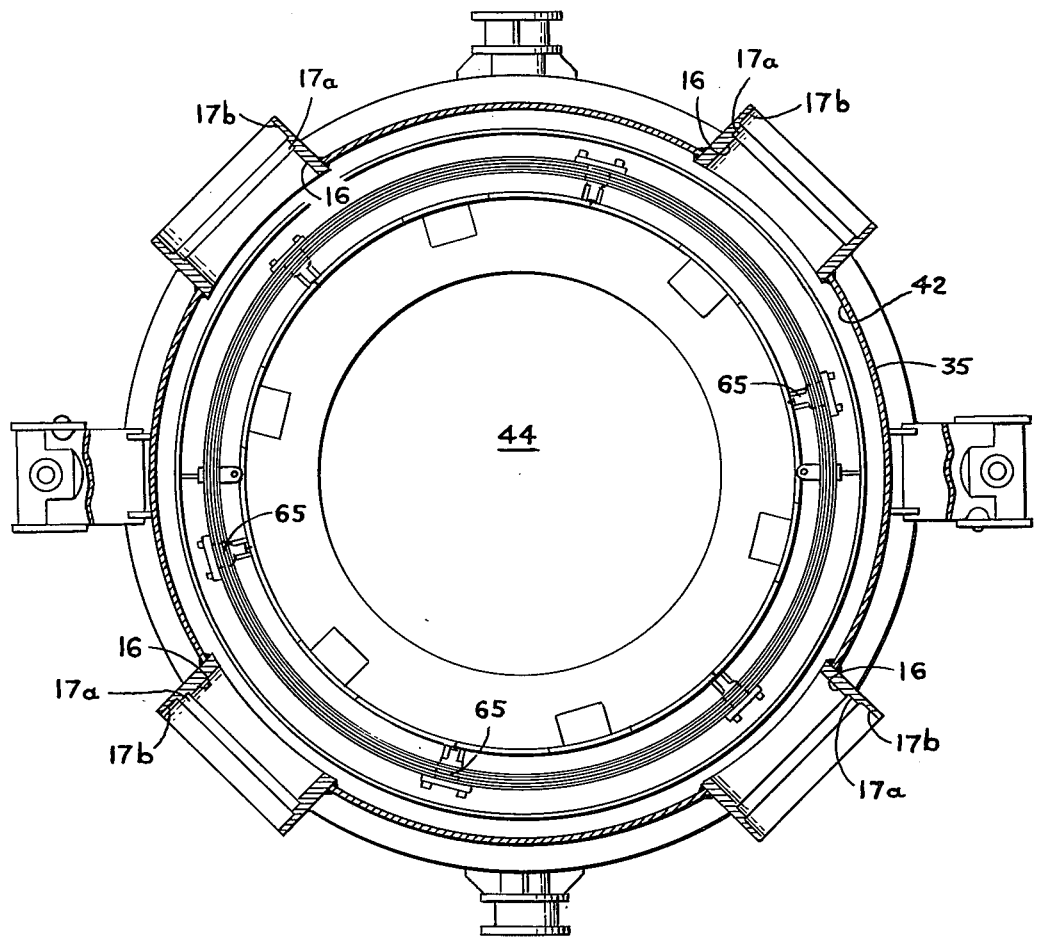
FIG. 3 is an enlarged horizontal section of the combustor, taken on line 3—3 of FIG. 1.
Figure 4A:
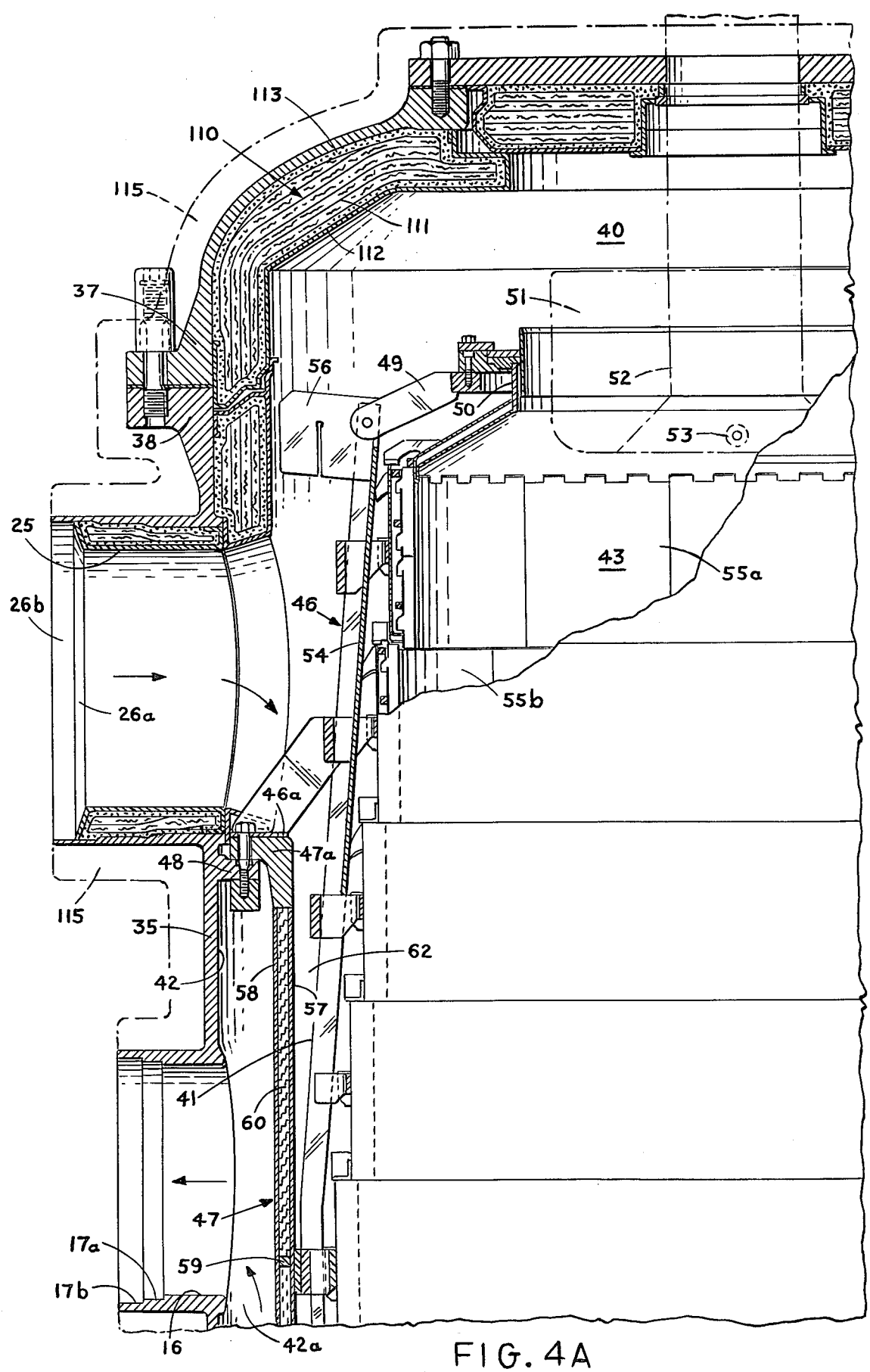
FIG. 4A is an enlarged fragmentary side view partly in vertical section of, the upper end of the outer casing, the upper end of the insulated partition, and the supporting assembly for the portion of the inner casing defining the primary combustion zone in the combustor shown in FIG. 1.

FIGS. 1, 3, and 4A show that exit ports 16 have a stepped wall thickness as at 17a and 17b so that when one end of a transfer line 18 is connected thereto as by welding, this stepped construction will act to minimize stress concentration due to flexure at this joint with variations in temperature. Such variations will occur mainly during starting up and shutting down conditions of operation of the combustor 1.

The opposite end of line 18 is connected to the inlet end 19 of heat transfer coils 20 in a regenerative heat exchanger 21 connected and disposed in communication with waste combustion products from the exhaust outlet 22 of the turbine 2. Thus the compressed air passing through the heat transfer coils 20 will be heated by the hot waste combustion products exhausting through the exhaust outlet 22 of the turbine 2.

Hot compressed combustion air at about 1050° F. and 145 P.S.I.G. exits from the outlet end 23 of the heat transfer coil to a return conduit 24 which is connected at one end to the outlet end 23 of the heat transfer coil and at the opposite end to the combustion air inlet ports 25 for the combustor 1. This hot combustion air will be combined with fuel in the combustor 1 to support combustion thereof as will be understood by those skilled in the art.

Similar to the exit ports 16 the combustion air inlet ports 25 will also have a stepped wall construction as at 26a and 26b for the same reasons respecting stress concentrations due to joint flexure.

Serially connected to the side of the regenerative heat exchanger 21 remote from the turbine is a boiler or waste heat recovery device 27. This device provides means for recovering further heat from the hot waste combustion gases passing from the turbine exhaust 22 to the exhaust stack 28. Thus a fluid such as water from any suitable source, not shown, can enter through line 29 and heat exchanger 30 in the boiler 27 where it will absorb this waste heat and will pass from the heat exchanger 30 through line 31 to any suitable process use either in the form of heated water or steam.

Regenerative open cycle gas turbine compressor system for recovering waste heat from exhaust combustion gases are known in the art. The system above described differs from the known prior art devices by utilizing the close coupling achieved by the support housing 2 of the compressor 3, turbine 4 and the combustor 1 now to be described.

THE COMBUSTOR

FIGS. 2 to 7 of the drawings show one preferred form of the combustor 1 as having a generally elongated hollow cylindrical outer casing 35 which is closed at its upper end by means of a separate closure or cover casing 36. Flange means as at 37 about the lower end of the closure or cover casing 36 and mating flange means 38 about the upper end of the outer casing 35 permit the outer casing and the cover casing to be connected to each other by any suitable type of connecting means such as threaded members 39.

In assembled position the closure or cover casing 36 defines a head cavity or space 40 at the upper end of the combustor 1 remote from the discharge outlet 15.

Mounted in and concentric to the outer casing 35 is an elongated cylindrical inner casing generally designated 41 which has a substantially lesser diameter than the diameter of the inner wall 42 of the outer casing 35 and as a result the inner casing 41 is spaced from the inner wall 42 of the outer casing as is shown in FIGS. 1, 4, 4A and 4B of the drawings.

The inner casing 41 defines a combustion chamber having a primary combustion zone 43 in the upper section and in the lower section thereof a secondary combustion zone 44 which is in serial alignment at its upper end with the primary combustion zone 43 and at its lower end with the discharge outlet 15 formed by the lowermost section 45 of the inner casing 41 through which the hot combustion gases pass to the inlet of the turbine as has been above described.

Figure 2:
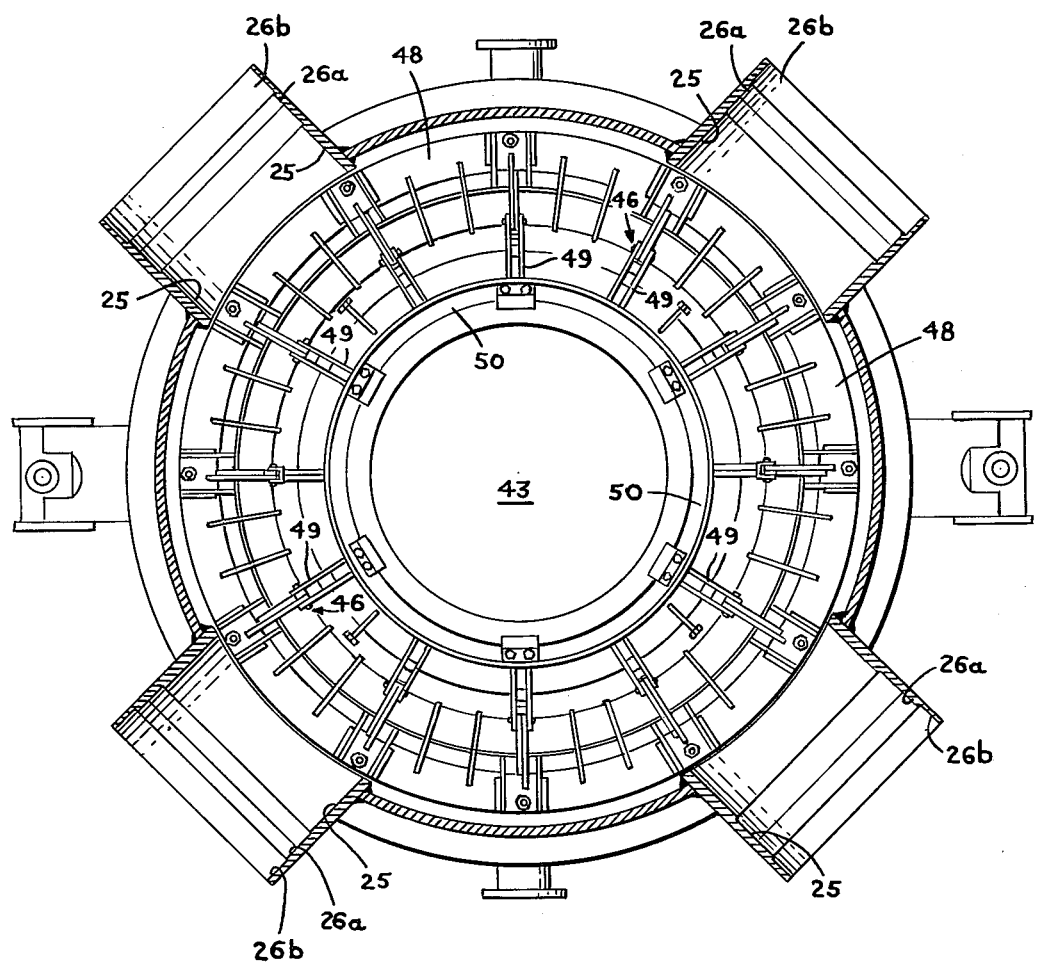
FIG. 2 is an enlarged top view with the closure or cover section removed and partly in horizontal section of the combustor shown in FIG. 1.

FIGS. 1, 2 and 4A further show that in the head cavity 40 and in the space formed between the inner wall 42 of the outer casing 35 and the inner casing 41 are a plurality of circumferentially spaced upwardly extending tile shield and support assemblies 46 and an elongated downwardly extending annular insulated partition and support assembly or radiation shield generally designated 47 each respectively mounted and connected as by an annular bracket 46a and annular flange 47a to an annular support bracket 48 formed on the inner wall 42 of the outer casing 35.

The annular insulated partition or radiation shield 47 forms with the inner wall 42 of the outer casing 35 an annular transport chamber or transfer passage 42a which communicates at its lower end with the combustion air entrance or inlet port 10 and at the end remote therefrom with the outlet ports 25 so that relatively cool entering combustion air will act to cool the wall of the outer casing and will be preheated as it passes through the combustor in a direction counter to the direction of flow of the combustion gases in the combustion chamber from the primary combustion zone 43 to the secondary combustion zone 44 and out of the combustor 1 through the distance outlet 15.

On the side opposite from the transfer passage 42a the annular insulated partition 47 forms with the exterior of the inner casing 41 a head extension cavity 62.

The annular insulated partition 47 has sufficient insulation and structural strength that it can withstand the differential pressure and differential temperature which exists between the transfer passage 42a and the head extension cavity 62.

The tile support assembly 46 has a plurality of circumferentially spaced trusses 49 one respective end of which is connected to the annular support bracket 48. The spaced trusss 49 arch upwardly into the head cavity and connect at the opposite ends to an annular ring 50 in which a metering swirler 51 is mounted.

Any suitable type of metering swirler may be utilized such as the one shown and described in U.S. Pat. No. 4,288,980. Accordingly, the metering swirler 51 will not be more fully described herein.

The metering swirler 51 acts to reduce the pressure of the entering high temperature combustion air and thus provides the required pressure drop between the head cavity or space 40 and the primary combustion zone 43 to maintain stable combustion therein.

Centrally disposed in the metering swirler is a fuel delivering means as at 52 and an ignition means 53 which is used to ignite the fuel and air mixture delivered through the metering swirler 51 and fuel delivering means 52 into the primary combustion zone 43.

PRIMARY COMBUSTION ZONE

FIGS. 1 and 4A further show that there extends downwardly from the spaced trusses 49 an inverted cup shaped support canopy as at 54 on the inner wall of which are mounted by any suitable means as will be understood by those skilled in the art, a plurality of interengaging fire wall tiles as at 55a, 55b, 55c, 55d and 55e. The fire wall tiles are disposed in the conventional stepwise tapered shape at the upper section of the inner casing 41 defining the primary combustion zone 43.

The fire wall tiles are made of a metal material or alloy which is capable of withstanding the vigorous thermal stresses developed in the primary combustion zone 43 during operation of the combustor 1.

The fire wall tiles will be cooled by convection and film flow of the hot combustion gases which flow downwardly from the head space through openings in the transverse portion of the support canopy 54 as is shown in FIG. 4A of the drawings.

The trusses 49 are also provided with a plurality of flow straightening vanes 56 which straighten the flow of the hot compressed combustion air entering through the inlet ports 25 communicating with the head space 40 before the same is transmitted and passed through the metering swirler 52 during operation of the combustor 1.

The elongated downwardly extending insulating partition and support assembly 47 disposed between the inner casing 41 and the inner wall 42 of the outer casing 35 has an inner cylindrical metal enclosure 57 and an outer cylindrical metal enclosure 58 which are held in spaced relation to each other by annular spacing brackets 59 so that thermal insulation 60 can be packed and held between the inner and outer metal shells to permit the partition and support assembly 47 to act as a heat or radiation shield shield for the outer casing 35 and thus will protect the outer casing from the intense heat generated in the primary combustion zone 43 and secondary combustion zone 44 all of which is shown in FIGS. 1, 4A and 4B of the drawings.

The annular partition and support assembly 47 extends downwardly the full length of the primary and secondary combustion zones 43 and 44 and is connected to the inner casing 41 about the lowermost annular ring section 45 thereof by means of a specially formed joint or seal assembly generally designated 61 and hereinafter more fully described which closes off the lower end of an annular head extension cavity 62 communicating at its upper end with the head space 40, as shown in FIG. 4C.

The head extension cavity 62 permits a portion of the heated compressed combustion air to expand and pass downwardly into the head extension cavity 62 so as to cool the walls of the inner casing 41 about the primary combustion zone 43 and secondary combustion zone 44 and to coact with and pass heated compressed combustion air to an impingement film cooled cylindrically shaped cooling and metering wall assembly generally designated 63 which defines the portion of the secondary combustion zone 44 where the thermal stresses are less vigorous than those in the primary combustion zone 43, as is shown in FIGS. 1, 4B and 4C of the drawings.

SECONDARY COMBUSTION ZONE

The cooling and metering assembly 63 defining the secondary combustion zone 44 is fabricated as a unitary hollow cylindrical element having an annular support ring 64 at its upper end which is so mounted as hereinafter described that it overlaps with the lower end of the fire wall tile 55e of the primary combustion zone in assembled position. At its lower end the cooling and metering assembly 63 forms the annular collar section 45 which defines the discharge outlet 15 for delivering the heated combustion gases from the combustor 1.

Annular support ring 64 coacts with a plurality of circumferentially spaced pin support assemblies 65 on the annular insulated partition and support assembly 47 as shown in FIGS. 1, 4B and 4C of the drawings.

The pin support assembly 65 extend radially inward from the partition and support assembly 47 for engagement with a corresponding number of thimble members 66 connected in circumferentially disposed radially outward extending support plates 67 connected on the outer face of the annular support ring 64 and the upper section of the annular cooling and metering wall assembly 63.

Each of the pin support assemblies 65 have annular pin support members 68 whose bores 69 are in alignment with the bore 70 of the respective thimble members 66 so that support pins 71 can be inserted from the outer face of the partition and support assembly 47 through the respective bores 69 and 70 to support the annular cooling and metering wall assembly 63 of the inner casing 41 defining the secondary combustion zone 44.

The pin 71 has a shoulder 72 which engages the pin support member 68 and the pin 71 is held in assembled position by a cap member 73 which is connected by threaded means 74 to the insulated partition and support assembly 47 all of which is shown in FIGS. 4B and 4C of the drawings.

FIGS. 1, 4B, 4C, 5, 6 and 7 show that the annular cooling and metering wall assembly 63 has a plurality of annular shaped and formed sections as at 73a, 73b, 73c, 73d etc. to 73o. The uppermost one of these annularly shaped and formed sections 73a is operatively connected as by welding about the lower end of the annular ring 64. The remaining sections are in turn operatively and serially connected by welding about the lower ends of each other until the lowermost one 73o is connected to the annular joint ring member 45 formed about the lowermost section of the inner casing 41.

The annular shaped and formed sections 73a, 73b, 73c, 73d to 73o are made in segments and are welded together to form the circumferential units 73a, 73b, 73d, 73d to 73o into an integral unit by welding the circumferentially formed units to a plurality of longitudinally disposed strut assemblies 74 as is shown in FIGS. 1, 4B, 5, 6 and 7 of the drawings.

The longitudinally disposed strut assemblies stiffen the cylindrical impingement/film cooled cooling and metering wall assembly 63 against local buckling which might be caused by the differential pressure drop between the pressure in the head extension space 62 on the outboard side of the cooling and metering wall assembly 63 and the pressure in the secondary combustion zone 44 on the inboard side thereof or similarly by the differential temperatures on opposite sides of this wall assembly.

Further as shown in FIGS. 5, 6, and 7 the elements of the cooling and metering wall assembly 63 will be butt welded as at 75a, 75b, 75c etc. and 76a, 76b, 76c and 76d to reduce failure thereof due to thermal fatigue.

In assembled position the circumferential shaped and formed sections 73a, 73b, 73c and 73d define a corresponding plurality of annular cooling chambers or spaces as at 77a, 77b, 77c 77d etc. as shown in FIGS. 1, 4B and 7 of the drawings. These cooling chambers or spaces 77a, 77b, 77c, 77d etc are formed in each of the associated circumferential units 73a, 73b, 73d etc. on the outboard side of each of the respective inner annular skirts 78a, 78b, 78c, 78d etc. on each of the circumferential units which inner annular skirts 78a, 78b, 78c, 78d etc. define the wall of the secondary combustion zone 44 of the combustion chamber formed in the inner liner 41.

Cooling chambers 77a, 77b, 77c, 77d etc at their upper end have a plurality of nozzle shaped combustion air inlet openings 79 which are disposed in spaced relation about each of the respective circumferentially shaped and formed sections 73a, 73b, 73c, 73d etc. At their lower ends cooling chambers 77a, 77b, 77c, 77d etc.

communicate with combustion air exit slots as at 80a, 80b, etc. formed by a clearance between the inner annular skirt sections 78a, 78b, etc. and the adjacent circumferential outer wall section 81 of the circumferential shaped and formed sections 73a, 73b, etc. all of which is shown in FIGS. 1, 4B, 4C, 5, 6, and 7 of the drawings.

The lower end of each of the inner annular skirts has a plurality of outwardly extending projection or bumps 82 as shown at FIG. 6 so that under the thermal stresses in the secondary combustion zone enclosure, the clearance of the air exit slots 80a, 80b, 80c, etc. to 80° will be maintained during the operation of the combustor 1.

Thus, during operation of the combustor 1, combustion air from the head extension space 62 can pass through the nozzle shaped combustion air inlet openings 79 into the respective cooling chambers and spaces 77a, 77b, etc. to 77° of the cooling and metering wall assembly 63 where it first serves to impingement cool the coacting adjacent associated inner annular skirts 78a, 78b, 78c, etc. to 78o, which form the wall of the secondary combustion zone 44. The nozzle shaped combustion air inlet openings 79 act to increase the velocity of the combustion air and to provide jet impingement and flow of a film of relatively cooler air across the side or back face of the associated inner annular skirt remote from the secondary combustion chamber 44. The bumps or projection 82 at the bottom of each skirt prevent the skirt from buckling and closing the respective air exit slots 80a, 80b, etc. to 80o. Heated combustion air from the regenerator will be injected through these exit slots 80a, 80b, etc. to 80o into the secondary combustion zone 44 to maintain mixing with primary combustion zone combustion gases therein when the combustor 1 is in operation.

Metering of heated combustion air into the cooling chambers 77a, 77b, etc. is best accomplished by proper sizing of inlet openings 79. This can also be accomplished and/or aided by varying the size of the exit slots 80a, 80b, etc. to 80o with respect to the combustion air inlet openings 79 and by sizing the chambers or spaces 77a, 77b, 77d, etc. Thus, the available cooling for the walls of the secondary combustion zone 44 can be controlled. The number of circumferentially shaped and formed sections 73a, 73b, 73c, 73d, etc. is adjusted, depending on the size of the particular secondary combustion zone for the given combustor.

In addition to the hot pressurized combustion air delivered through the cooling and metering wall assembly 63, a plurality of circumferentially spaced flow openings as at 83a, 83b are provided in the cooling and metering wall assembly 63 which communicate between the head extension space 62 and the secondary combustion zone 44. These openings deliver the major percentage of the hot combustion air to the secondary combustion zone 44 to support combustion.

The joint or seal assembly 61 is mandated between the insulated partition and support assembly 47 and inner casing 41 to which the partition and support assembly 47 is connected to both seal the head extension space 62 from the cooling and transfer passage 42a and to overcome problems of differential thermal expansion that occur between these elements during the operation of the combustor 1.

Thus by reference to FIGS. 1, 4B and 4C of the drawings, the joint and seal assembly 61 is shown as including, an upper slip joint as at 85 which is mounted about the lowermost end of the partition and support assembly 47, a lower slip joint 86 which is connected about the lowermost annular ring section 45 of the inner casing 41, and a flexible annular spin formed metallic ring 87 having its upper peripheral edge portion 88 mounted in a slot 89 in the upper slip joint 85 and its lower peripheral edge section 90 disposed in a slot 91 formed between the upper or lower annular L-shaped segments as at 92 and 93 which are clamped together with an annular member 94 to the annular joint and seal support ring 45 on the inner casing 41 by means of threaded members 95 and 96 all of which is shown in FIGS. 4B and 4C of the drawings.

Between the annular member 87 and the support ring 45 on the inner casing 41, an annular space 97 is formed which communicates with a plurality of openings as at 98 to permit relatively cool compressed combustion air entering through the entrance port 12a to pass into the annular space 97 to prevent formation of local hot spots on the wall of the inner casing 41.

Sealing means for the joint and seal assembly 61 is provided by a plurality of annealed soft metal wire rings as at 99 and 100 in the upper slip joint 85 to engage opposite sides of the upper peripheral section 88 of the spin formed metal ring 87 and similarly annealed soft metal wire rings are provided as at 101 and 102 on the lower slip joint 86 on opposite sides of the lower peripheral section 90 of the spin formed metal ring 87 all of which is also shown at FIGS. 4C of the drawings.

This sealing arrangement can be utilized on the combustor 1 because even though this is a relatively closed dead ended annulus where cooling by convection is difficult to obtain because of the low and uneven cooling combustion air velocities, nonetheless considerably less cooling air is required as this is a less thermally loaded area than in the primary combustion zone 43 and secondary combustion zone 44 for the same allowable metal mean/wall temperature or considerably lower enclosure metal mean/wall temperature in this area.

The insulated partition and support structure 47 on its outboard or opposite side from the head extension space 62 forms with the inner wall 42 of the outer casing 35, the cooling and transfer passage 42a which communicates with the combustion air entrance port 12a for passing the compressed combustion air from the compressor 4 to the regenerator heat exchanger 21 as was above described.

This construction provides both a radiation shield and a cooling mechanism for the outer casing 35 so that the outer casing can be made from materials which do not have to withstand the vigorous service conditions which prevail in the highly thermally loaded areas of the primary combustion zone 43 and secondary combustion zone 44 in the inner casing 41.

In addition to the heat shield provided by the partition and support structure 47 the combustor 1 is shown as having thick ceramic fiber insulation build up in layers inside heavy gauge sheet metal enclosures as at 110 about the entire head cavity and piping section of the combustor. This permits both the outer casing 35 and the upper casing or closure member 36 to be made of low alloyed carbon steels, as is shown by FIG. 4A of the drawings.

The various ceramic fiber insulation layers 111 inside the sheet metal enclosure 112 are framed by heavy gauge stainless steel mesh 113 to minimize damage to the thermal insulation in case of sheet metal failure which would cause hot spots and failure in the closure or upper casing 36.

To avoid this inherent danger where low alloyed carbon steel is used for the closure or upper casing 36, it may be desirable to utilize a nickle based alloy such as Nicoloy 800. Such nickle based alloys retain sufficient strength at the operating temperatures in the head cavity 40 that the internal insulation 110 may be eliminated and conventional exterior insulation or lagging shown by the dotted lines at 115 in FIG. 4A may be used to prevent heat loss from the system.

A slip fit seal assembly generally designated 120 connects the lowermost annular ring section 45 to the casing 121 defining the inner flow passage means 19 and the support housing 2 and is constructed to meter limited leakage of relatively cool compressed combustion air from the entrance flow passage 12a into the hot combustion gases discharging from the discharge outlet 15. This is accomplished by providing a plurality of lateral projection or bumps 122 at the lower end of the annular ring 120. These bumps function for the same purpose as the bumps on the respective inner skirts 78a, 78b, etc. of the circumferentially spaced cooling and metering wall units 73a, 73b, etc. as above described.

OPERATION

In operation the compressor 4 is turned over by any suitable type of starting motor, not shown, and compressed air is charged into the system to purge the same.

Fuel is now fed through the fuel injection means 52 to combine with the regenerator pre-treated compressed combustion air entering into the primary combustion zone 43 through the swirler 51 and the ignition means 53 ignites the fuel and warm compressed combustion air mixture to commence combustion.

The regenerator pre-heated compressed combustion air entering through the inlet 25 will impringe against the outer surface of the conical cup shaped support canopy 54 and this will prevent the fire wall tiles from being buffeted by the incoming pre-heated compressed combustion air.

Combustion will continue as long as the fuel and combustion air mixture in the right proportion enters the primary combustion zone.

The burning combustion air and fuel mixture will expand from the primary combustion zone 43 into the secondary combustion zone 44 where regenerator pre-heated compressed combustion air enters through the passages or openings 83a, 83b etc. and the passing through the head extension passage 62 in parallel flow to the direction of the combustion gases flowing through the primary zone and secondary zone exit slots 80a, 80b, etc. to 80o to control the temperatures of combustion and as a mixing and dilution function to provide even temperature distribution in the secondary combustion zone and to maintain continued combustion therein.

The hot combustion gases expand from the secondary combustion zone through the discharge outlet 15 of the inner casing 14 to the second flow passage 19 where they pass to the inlet 14 of the turbine 2 which drives the entire system.

Waste heat from the spent hot combustion gases is used in the heat exchanger 21 to heat the compressed combustion gases to the desired elevated operating temperature for the combustor 1.

Further the spent hot combustion gases passing through the boiler 27 heat process water to steam all as has been above described.

Thus, a combustor specially designed for regenerative open cycle gas turbine systems has been described which operates reliably with regenerator pre-heated compressed combustion air at temperatures of 1000° F. and higher thus providing an improved regenerative open cycle gas turbine system.

It will be understood that the invention is not to be limited to the specific construction or arrangement of parts shown but that they may be widely modified within the invention defined by the claims.

What is claimed is:

1. A diverter and parallel flow combustor for providing hot combustion gases comprising,
   a. outer casing means closed at one end to form a head cavity having, an inlet for heated compressed combustion air communicating with said head cavity,
   b. inner casing means mounted in the outer casing means defining therein combustion chamber means having, an inlet at one end in communication with said head cavity to receive the heated compressed combustion air and fuel to be burned in said combustion chamber means, and having a discharge outlet for hot combustion gases at the end thereof remote from the inlet,
   c. annular connecting means in said outer casing means a spaced distance from the head cavity and,
   d. an insulated annular partition and support means connected at one end in sealing engagement with the annular connecting means and at the opposite end in slip-fit sealing engagement about the inner casing means,
   e. said insulated annular partition and support means disposed between said outer casing means and said inner casing means to define with the wall of the outer casing means an independent cooling and transfer flow passage for passing relatively cool compressed combustion air therethrough and to define with the wall of the inner casing means a head cavity extension space communicating at one end with said head cavity on the side of the annular insulated partition and support means opposite from the cooling and transfer passage to receive heated compressed combustion air,
   f. an exit port means in said outer casing in communication with the cooling and transfer flow passage, and
   g. said inner casing having a cooling and metering wall assembly in the medial section thereof having, inlet means in communication with the head extension space and exit means in communication with the combustion chamber means to pass heated compressed combustion air to the medial section of said combustion chamber means to sustain combustion therein during operation of the counter flow combustor, and
   h. an entrance passage means between the outer casing means and the inner casing means about said discharge outlet in communication with the cooling and transfer flow passage to pass combustion air to and through said cooling and transfer flow passage to said exit port in a direction counter to the direction of flow of combustion gases exhausting through said discharge outlet.

2. In the combustor as claimed in claim 1 wherein said cooling and metering wall assembly has,
   a. a plurality of cooling chambers formed circumferentially and serially along the length thereof, b. said cooling chambers connected to the inlet means in communication with the head space to receive heated compressed combustion air therefrom, and
c. said cooling chambers communicating with the exit means at a point spaced from the inlet means.

3. In a combustor as claimed in claim 2 wherein,
a. the inlet means for the plurality of cooling chambers includes, a plurality of spaced and sized openings,
b. the exit means in communication with the plurality of cooling chambers in said cooling and metering assembly are formed as sized slots in the wall of the inner casing means,
c. the sizing of the openings of said inlet means and the sizing of said slots act to control the degree of cooling of the cooling and metering wall assembly of the inner casing defining the combustion chamber.

4. In a combustor as claimed in claim 1 including, support means in the medial section of said annular partition and support means, operatively and supportably holding the cooling and metering wall assembly in assembled position in the combustor.

5. In a combustor as claimed in claim 4 wherein the support means on the annular partition and support means includes,
a. support bracket means on the annular partition and support means having, a first radial bore therethrough,
b. thimble member means connected about the cooling and metering wall assembly having, a second radial bore therethrough disposed in assembled position to align with the first radial bore, and
c. pin means extending through the first radial bore and second radial bore to support the cooling and metering wall assembly in assembled position.

6. In a combustor as claimed in claim 1 wherein said annular partition and support means includes,
a. a joint and seal means connecting the lower end of the annular partition and support means to the inner casing to separate the cooling and transfer passage from the head extension space, and
b. said joint and seal means, has at least one sliding seal to allow for expansion and contraction with changes in thermal expansion in the combustor.

7. In the combustor as claimed in claim 6 wherein the joint and seal means includes,
a. an upper sliding seal section,
b. a lower sliding seal section, and
c. a spin formed annular member having an upper peripheral end operatively connected for sliding relation with the upper sliding seal section, and a lower peripheral end operatively connected for sliding relation with the lower sliding seal section.

8. In the combustor as claimed in claim 2 wherein, said cooling and metering wall assembly includes a plurality of circumferentially disposed supporting struts.

9. In the combustor as claimed in claim 5 wherein,
a. said cooling and metering wall assembly includes a plurality of circumferentially disposed supporting struts,
b. support brackets circumferentially disposed about the outer wall of the cooling and metering wall assembly, and
c. said thimble means each connected to an associated one of the support brackets.

10. In a combustor as claimed in claim 1 wherein said cooling and metering wall assembly includes,
a. a plurality of circumferentially shaped and formed sections connected serially to each other,
b. a plurality of cooling chambers,
c. at least one of said plurality of cooling chambers disposed in each of said circumferentially shaped and formed sections, and
d. a plurality of circumferentially spaced longitudinally disposed struts connecting said circumferentially shaped and formed sections to prevent buckling of the cooling and metering wall assembly under the pressure and thermal stresses acting during operation of the combustor.

11. In the combustor as claimed in claim 2 wherein the cooling and metering wall assembly includes,
a. a plurality of circumferentially shaped and formed sections connected serially to each other,
b. at least one of said plurality of cooling chambers disposed in each of said circumferentially shaped and formed sections, and
c. said shaped and formed sections having, an outer wall section, and an inner skirt section the free end of which is operatively associated with the outer wall section to define exit means in the form of slots in the wall defining the secondary combustion zone of the combustion chamber.

12. In the combustor as claimed in claim 11 wherein the inner skirt section has a plurality of circumferentially spaced projections which prevents the slots defining the exit means from becoming closed due to pressure and thermal distortion during operation of the combustor.

13. In a combustor as claimed in claim 1 wherein,
a. the outer casing is fabricated of alloyed carbon steel, and
b. the interior wall of the outer casing in the area of the head cavity has insulating means consisting of, a sheet metal enclosure, high temperature insulation material in said sheet metal enclosure, and heavy gauge stainless steel wire mesh formed between the insulation material and the sheet metal enclosure.

14. In the combustor as claimed in claim 13 wherein the sheet metal enclosure is made of stainless steel.

15. In a combustor as claimed in claim 1 wherein,
a. the outer casing is fabricated of nickle alloys such as Nicoloy 800, and
b. insulation lagging is provided on the outer face of the outer casing to increase the efficiency of said combustor.

16. In a regenerative open cycle turbine system the combination of;
a. turbine means having an inlet or combustion gases, and an outlet for waste combustion gases,
b. a diverter and parallel flow combustor for supplying combustion gases to the inlet of the turbine means, having an entrance inlet, and a discharge outlet,
c. a compressor driven by the turbine means having an outlet to supply compressed combustion air for the combustor,
d. support assembly means disposed between the outlet end of the compressor and the inlet end of the turbine, said combustor supportably mounted on said support assembly means, and
e. the support assembly means having, first flow passage means connecting the outlet of the compressor to the entrance inlet for the combustor, and a second flow passage means for connecting the discharge outlet on the combustor with the inlet of the turbine means, and f. said combustor includes,
  i. outer casing means closed at one end to form a head cavity having, an inlet for heated compressed combustion air communicating with said head cavity,
  ii. inner casing means mounted in the outer casing means defining therein combustion chamber means having an inlet at one end for a mixture of heated compressed combustion air and fuel to be burned in said combustion chamber mans, and having a discharge outlet for hot combustion gases at the end thereof remote from the inlet,
  iii. an annular connecting means in said outer casing means a spaced distance from the head cavity end,
  iv. an insulated annular partition means connected at one end in sealing engagement with the annular connecting means and at the opposite end in slip-fit sealing engagement about the inner casing means,
  v. an insulated annular partition means disposed between said outer casing means and said inner casing means to define with the wall of the outer casing means an independent cooling and transfer passage for passing relatively cool compressed combustion air through said outer casing and to define with the wall of the inner casing means a head cavity extension space communicating at one end with said head cavity to receive heated compressed combustion air,
  vi. an entrance inlet formed on the combustor and disposed for communication with the cooling and transfer passage to deliver the relatively cool compressed combustion air thereto, and
  vii. said outer casing having an outlet in communication with the cooling and transfer passage for passing the relatively cool compressed combustion air to a source of heat.

17. In the regenerative open cycle turbine system as claimed in claim 16 including,
  a. regenerative heat exchange means connected to the outlet for the turbine for communication with the waste combustion gases, and having a regenerative heat exchange inlet and a regenerative heat exchange outlet,
  b. the outlet for the cooling and transfer passage connected to the regenerative heat exchange inlet and the regenerative heat exchange outlet connected to the inlet for the head cavity to pass heated compressed combustion air thereto.

18. In the regenerative open cycle turbine system as claimed in claim 16 including,
  a. process steam heat exchange means connected to the outlet for the turbine for communicating with the waste combustion gases, and having a process water heat exchange inlet and a process water heat exchange outlet,
  b. process steam disposed to be passed to the process steam heat exchange inlet and process steam heat exchange outlet to recover waste heat from said waste combustion gases.

19. In the regenerative open cycle turbine system as claimed in claim 16 including,
  a. regenerative heat exchange means connected to the outlet for the turbine for communication with the waste combustion gases, and having a regenerative heat exchange inlet and a regenerative heat exchange outlet,
  b. the outlet for the cooling and transfer passage connected to the regenerative heat exchange inlet, and the regenerative heat exchange outlet connected to the inlet for the head cavity to pass heated compressed combustion air thereto,
  c. process water heat exchange means connected to the outlet for the turbine for communication with the waste combustion gases, and having a process water heat exchange inlet and a process water heat exchange outlet, and
  d. process water connected to said process water heat exchange inlet and said process water heat exchange outlet to pass process water to and from the process water heat exchanger to recover waste heat from the waste combustion gases.

20. In the regenerative open cycle turbine system as claimed in claim 16 wherein said inner casing has a cooling and metering assembly in the medial section thereof having a plurality of cooling chambers formed thereon respectively having inlet means in communication with the head cavity extension space and exit means in communication with the combustion chamber means to pass compressed combustion air to the medial section of said combustion chamber means to sustain combustion during operation of the counter flow combustor.

21. In the regenerative open cycle turbine system as claimed in claim 20 wherein the cooling and metering wall assembly includes,
  a. a plurality of circumferentially shaped and formed sections connected serially to each other,
  b. at least one of said plurality of cooling chambers disposed in each of said circumferentially shaped and formed sections, and
  c. said shaped and formed sections having, an outer wall section, and an inner skirt section the free end of which is operatively associated with the outer wall section to define exit means in the form of slots in the wall defining the secondary combustion zone of the combustion chamber.

22. In the regenerative open cycle turbine system as claimed in claim 21 wherein the inner skirt section has a plurality of circumferentially spaced projections which prevents the slots defining the exit means from becoming closed due to pressure and thermal distortion during operation of the combustor.

23. In the regenerative open cycle turbine system as claimed in claim 20,
  a. the inlet means for the plurality of cooling chambers includes, a plurality of spaced openings,
  b. the exit means in communication with the plurality of cooling chambers in said cooling and metering assembly are formed as slots in the wall of the inner casing means,
  said sizing of the openings of said inlet means and the sizing of said slots act to control the degree of cooling of the cooling and metering wall assembly of the inner casing defining the combustion chamber.

24. In the regenerative open cycle turbine system as claimed in claim 16 including,
  support means in the medial section of aid annular partition and support means, operatively and supportably holding the cooling and metering wall assembly in assembled position in the combustor.

25. In the regenerative open cycle turbine system as claimed in claim 24 wherein the support means on the annular partition and support means includes,
   a. support bracket means on the annular partition and support means having, a first radial bore therethrough,
   b. thimble member means connected about the cooling and metering wall assembly having, a second radial bore therethrough disposed in assembled position to align with the first radial bore, and
   c. pin means extending through the first radial bore and second radial bore to support the cooling and metering wall assembly in assembled position.

26. In the regenerative open cycle turbine system as claimed in claim 26 wherein,
   a. said outer casing means is provided with an annular flange means on the inner wall thereof adjacent the head cavity end of the combustor,
   b. said annular partition and support means is connected at its upper end to said annular flange means, and a joint and seal means connecting the lower end of the annular partition and support means to the inner casing to separate the cooling and transfer passage from the head extension space, and
   c. said joint and seal means includes, at least one sliding seal to allow for expansion and contraction with changes in thermal expansion in the combustor.

27. In the regenerative open cycle turbine system as claimed in claim 26,
   a. an upper sliding seal section,
   b. a lower sliding seal section, and
   c. a spin formed annular member having an upper peripheral end operatively connected for sliding relation with the upper sliding seal section, and a lower peripheral end operatively connected for sliding relation with the lower sliding seal section.

28. In the regenerative open cycle turbine system as claimed in claim 20 wherein said cooling and metering wall assembly includes a plurality of circumferentially disposed supporting struts.

29. In the regenerative open cycle turbine system as claimed in claim 25 wherein,
   a. said cooling and metering wall assembly includes a plurality of circumferentially disposed supporting struts,
   b. support brackets circumferentially disposed about the outer wall of the cooling and metering wall assembly, and
   c. said thimble means each connected to an associated one of the support brackets.

30. In the regenerative open cycle turbine system as claimed in claim 20 wherein,
   a. the cooling and metering wall assembly includes, a plurality of circumferentially shaped and formed sections connected serially to each other,
   b. at least one of said plurality of cooling chambers disposed in each of said circumferentially shaped and faced sections, and
   c. a plurality of circumferentially spaced longitudinally disposed struts connecting said circumferentially shaped and formed sections to prevent buckling of the cooling and metering assembly under the pressure and thermal stresses acting during the operation of the combustor.

* * * * *